US009233666B2

(12) United States Patent
Al-Regib et al.

(10) Patent No.: US 9,233,666 B2
(45) Date of Patent: Jan. 12, 2016

(54) SHIFT-BY-WIRE VEHICLE AND METHOD TO VERIFY SECUREMENT

(71) Applicant: FORD GLOBAL TECHNOLOGIES, LLC, Dearborn, MI (US)

(72) Inventors: Emad Al-Regib, Westland, MI (US); Brian J. Deurloo, Howell, MI (US); Todd Curtis Spaulding, Ann Arbor, MI (US); Derek Kinch, Ypsilanti, MI (US); Jeffrey James Tumavitch, Livonia, MI (US); Richard Reynolds Hathaway, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/294,386

(22) Filed: Jun. 3, 2014

(65) Prior Publication Data
US 2015/0344004 A1    Dec. 3, 2015

(51) Int. Cl.
  *B60T 7/12*   (2006.01)
  *B60T 1/06*   (2006.01)
  *B60T 8/32*   (2006.01)
  *B60W 10/10*  (2012.01)

(52) U.S. Cl.
CPC . *B60T 1/062* (2013.01); *B60T 7/12* (2013.01); *B60K 41/262* (2013.01); *B60K 2741/265* (2013.01); *B60T 8/32* (2013.01); *Y10T 477/817* (2015.01); *Y10T 477/82* (2015.01)

(58) Field of Classification Search
CPC ......... B60T 7/12; B60T 8/32; Y10T 477/817; Y10T 477/82; B60K 41/262; B60K 2741/265

USPC ....................................................... 701/53, 62
See application file for complete search history.

(56) References Cited

U.S. PATENT DOCUMENTS

| 5,139,315 | A  | * | 8/1992 | Walenty et al. ............... 303/162 |
| 6,689,014 | B2 |   | 2/2004 | Fleming et al. |
| 7,231,994 | B2 |   | 6/2007 | Buglione et al. |
| 2005/0075773 | A1 |   | 4/2005 | Schweizer et al. |
| 2008/0040009 | A1 | * | 2/2008 | Kamada et al. ................. 701/51 |
| 2008/0167783 | A1 |   | 7/2008 | Gierer et al. |
| 2010/0048352 | A1 | * | 2/2010 | Yamamoto ...................... 477/92 |
| 2011/0087386 | A1 |   | 4/2011 | Steinhauser et al. |
| 2011/0130929 | A1 |   | 6/2011 | Chang et al. |

(Continued)

FOREIGN PATENT DOCUMENTS

| EP | 1103744 A2 * | 5/2001 |
| EP | 2468593 A1 * | 6/2012 |

(Continued)

*Primary Examiner* — Roger Pang
(74) *Attorney, Agent, or Firm* — James Dottavio; Brooks Kushman P.C.

(57) ABSTRACT

A vehicle includes both a transmission park mechanism and an electronic parking brake. As a failure management strategy, a controller monitors vehicle movement to verify that the park mechanism is successfully restraining the vehicle against movement. Specifically, when the driver releases the brake pedal with the transmission park mechanism commanded to restrain the vehicle, the controller waits for a predetermined amount of time. If the vehicle moves during this time, the controller commands application of the electronic parking brake. The controller may also command application of the electronic parking brake if the vehicle does not come to a stop after the transmission park mechanism is commanded to restrain the vehicle.

11 Claims, 3 Drawing Sheets

(56) References Cited

U.S. PATENT DOCUMENTS

2013/0252784 A1* 9/2013 Kinoshita et al. ............... 477/92
2013/0317720 A1* 11/2013 Kaita et al. ..................... 701/99
2014/0032074 A1* 1/2014 Hasegawa et al. .............. 701/70

FOREIGN PATENT DOCUMENTS

| WO | WO2013034559 A1 | * | 3/2013 |
| WO | WO2014069429 A1 | * | 8/2014 |

* cited by examiner

SHIFT-BY-WIRE VEHICLE AND METHOD TO VERIFY SECUREMENT

TECHNICAL FIELD

This disclosure relates to the field of controlling vehicles. More particularly, the disclosure pertains to an apparatus and method to ensure that a vehicle is secured against movement after driver engagement of Park.

BACKGROUND

Drivers of passenger cars equipped with an automatic transmission typically control the operation of transmission via a control device. The transmission control device is used to select several ranges, such as Park, wherein the transmission is locked to prevent the vehicle from moving, Neutral, wherein the transmission allows the vehicle to be moved freely, such as when being towed, Reverse, wherein the transmission allows the vehicle to move backwards, and one or more Drive ranges that enable forward motion of the vehicle. Usually, the transmission control device is in the form of a lever connected mechanically, such as via a cable, to the transmission. Typically, the lever is also mechanically connected to an indicator. The mechanical connection between the control device and the transmission is not impacted by whether or not the engine is running or whether electronic components in the vehicle are powered.

In a shift-by-wire transmission arrangement, the mechanical connection between the transmission control device and the transmission is eliminated. Instead, the transmission control device is configured to transmit an electrical signal to an electronic controller. The controller electronically directs actuators to provide the transmission behavior associated with the selected range. The actuators may be motors that rotate when provided with electrical current, solenoids that regulate a hydraulic pressure in response to changes in an electrical current, or other devices that respond to electrical current or voltage. The gear shift module is not necessarily in the form of a lever because the control device is no longer moving a mechanical connection for controlling the transmission. Instead, the control device may be an electro-mechanical interface (e.g., a series of buttons, lever or knob) that is used to instruct the transmission to switch between transmission ranges.

When the Park range is selected, the transmission output shaft is held against rotation to prevent vehicle movement. The Park range may remain selected for long periods of time during which the operator typically leaves the vehicle unattended. During these periods, the engine and most electrical components are off. Therefore, the Park function of preventing vehicle movement must be maintained independent of the state of the engine or the vehicle electrical system.

SUMMARY OF THE DISCLOSURE

A method of operating a vehicle includes electronically commanding engagement of a transmission park mechanism in response to a park triggering condition and then, while the park triggering condition continues, responding to vehicle movement by automatically engaging an electronic park brake to restrain the vehicle. The park triggering mechanism may be, for example, a driver moving a shift lever to a park position to select a park mode. In some cases, the park triggering mechanism may occur while the vehicle is moving. In such cases, the method may include waiting until the vehicle speed decreases below a park mechanism ratcheting threshold speed before commanding engagement of the electronic park brake. After the vehicle comes to a stop and the driver releases a brake pedal, the method may include monitoring vehicle position for a predetermined time. If the driver turns the ignition key off during the predetermined time, the method may include postponing a shutdown process for the controller until the end of the predetermined period.

A vehicle includes a transmission park mechanism, an electronic parking brake acting independently of the park mechanism, and a controller. The controller is programmed to respond to vehicle movement after release of a brake pedal while the park mechanism is commanded to provide park by applying the parking brake. The transmission park mechanism may be commanded to provide park by a driver moving a shift lever to a park position. The controller may monitor vehicle speed for a predetermined amount of time following release of a brake pedal with the vehicle stopped. Even if the driver turns an ignition key to an off position during the predetermined amount of time, the controller may delay a shutdown process until after the predetermined amount of time.

A controller includes communications channels and control logic. The communications channels are configured to receive a signal indicating vehicle movement, such as a signal from a speed sensor. The communications channels is also configured to send a signal commanding engagement of an electronic parking brake. The communications channels may also be configured to send a signal controlling a parking pawl position and to receive a signal indicating the parking pawl position. The communications channels may also be configured to receive signals from a brake pedal and an ignition switch. The control logic is configured to respond to movement of the vehicle while a parking pawl is commanded to be in a park position by commanding engagement of the electronic parking brake. The control logic may be further configured to monitor vehicle speed for a predetermined amount of time following release of a brake pedal. Even if the driver turns the ignition switch to an off position during the predetermined amount of time, the control logic may delay a controller shutdown until the end of the predetermined amount of time.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
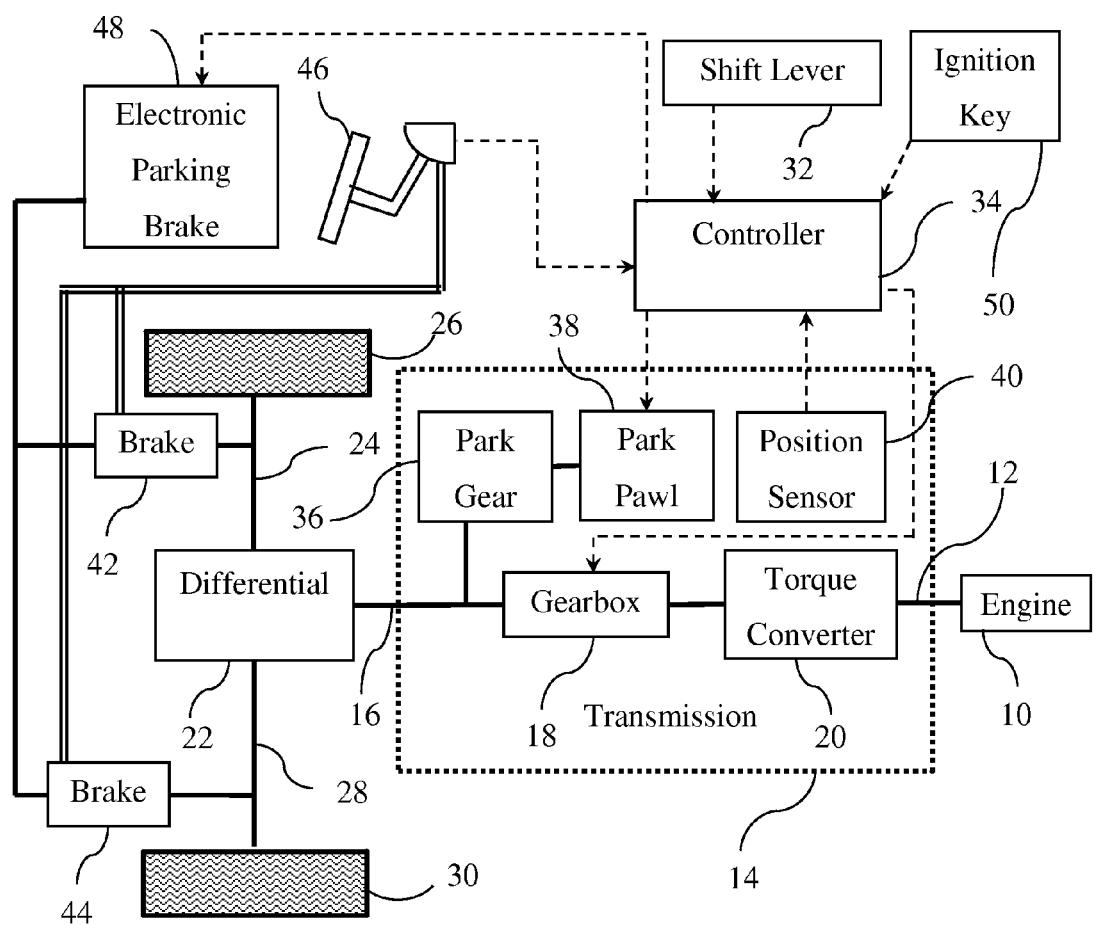
FIG. 1 is schematic diagram of a shift-by-wire vehicle powertrain and a braking system.

FIG. 1 schematically illustrates a vehicle powertrain. Mechanical connections are illustrated by single solid lines. Hydraulic connections are illustrated by double solid lines. Dashed lines represent the control signals. Engine 10 converts chemical energy in fuel to mechanical power at crankshaft 12. Transmission 14 transmits the power from crankshaft 12 to transmission output shaft 16. Transmission output shaft 16 rotates at a speed proportional to vehicle speed which may differ significantly from the speed at which the engine can efficiently produce the power. Transmission 14 accommodates these requirements. At low vehicle speed, transmission 14 reduces the speed and multiplies the torque for improved performance. At high vehicle speed, transmission 14 permits the engine to operate at a lower speed for quite, fuel efficient cruising. Transmission 14 includes a gearbox 18 which establishes a variety of forward speed ratios and at least one reverse speed ratio. Transmission 14 also includes a launch device such as torque converter 20 capable of transmitting torque when the driveshaft is stationary in order to start the vehicle moving. Differential 22 divides the power from transmission output shaft 16 between a left axle shaft 24 driving a left wheel 26 and a right axle shaft 28 driving a right wheel. In a rear wheel drive configuration, the differential is typically connected to transmission output shaft by a driveshaft. In a front wheel drive vehicle, the differential is typically integrated with the transmission.

The driver controls transmission 14 by manipulating a transmission control device such as shift lever 32 to select the transmission range. When the driver selects either the Drive or Reverse range, controller 34 commands engagement of clutches in gearbox 18 to establish a power flow path with an appropriate sped ratio. When the driver commands either the Neutral or Park ranges, controller 34 either commands no clutches to engage or fewer clutches than required to establish a power flow path. Clutches that are not commanded to engage passively release such that no power flow path is established in Neutral and Park.

Park is implemented by a park gear 36 fixedly coupled to the transmission output shaft 16 and a park pawl 38. Controller 34 commands park pawl to move into one of two positions. When the shift level is in any position other than Park, controller 34 commands park pawl 38 to a non-Park position in which it does not engage with park gear 36 and output shaft 16 is free to rotate. In a Park position, park pawl 38 engages park gear 36 holding output shaft 16 against rotation. As long as the downstream components of the powertrain are intact and the wheels have traction, holding the transmission output shaft stationary holds the vehicle stationary. If output shaft 16 is rotating above a ratchet speed when park pawl 38 is moved to the Park position, park pawl 38 does not immediately engage park gear 36 but instead bounces off the park gear, called ratcheting, until the vehicle slows enough that the park pawl drops into engagement. This feature prevents sudden stopping of the output shaft at high vehicle speed if a driver accidentally moves the shift lever to Park. Position sensor 40 indicates to the controller which of the two positions park pawl 38 is presently in, permitting controller 34 to verify that the pawl has moved as commanded. Park pawl 38 is designed to remain in its present position in the absence of commands from controller 34.

The vehicle also includes brakes 42 and 44 to slow left axle 24 and right axle 28 respectively. These are hydraulically actuated by depressing brake pedal 46. Finally, the vehicle includes an electronic park brake (EPB) 48. The EPB is mechanically connected to both brake 42 and 44 and engages both wheel brakes in response to a signal from controller 34, independently of the position of brake pedal 46. Although electrical power is required to apply the EPB, the EPB is designed to remain in the applied position restraining the rear wheels from rotation without electrical power. The driver can command either application or release of EPB 48. However, controller 34 is not configured to command release of the EPB.

Normally, the controller is powered on when ignition key 50 is turned to an ON position and powered off when the ignition key is turned to an OFF position. However, the controller can delay the shutdown process is some circumstances.

Figure 2:
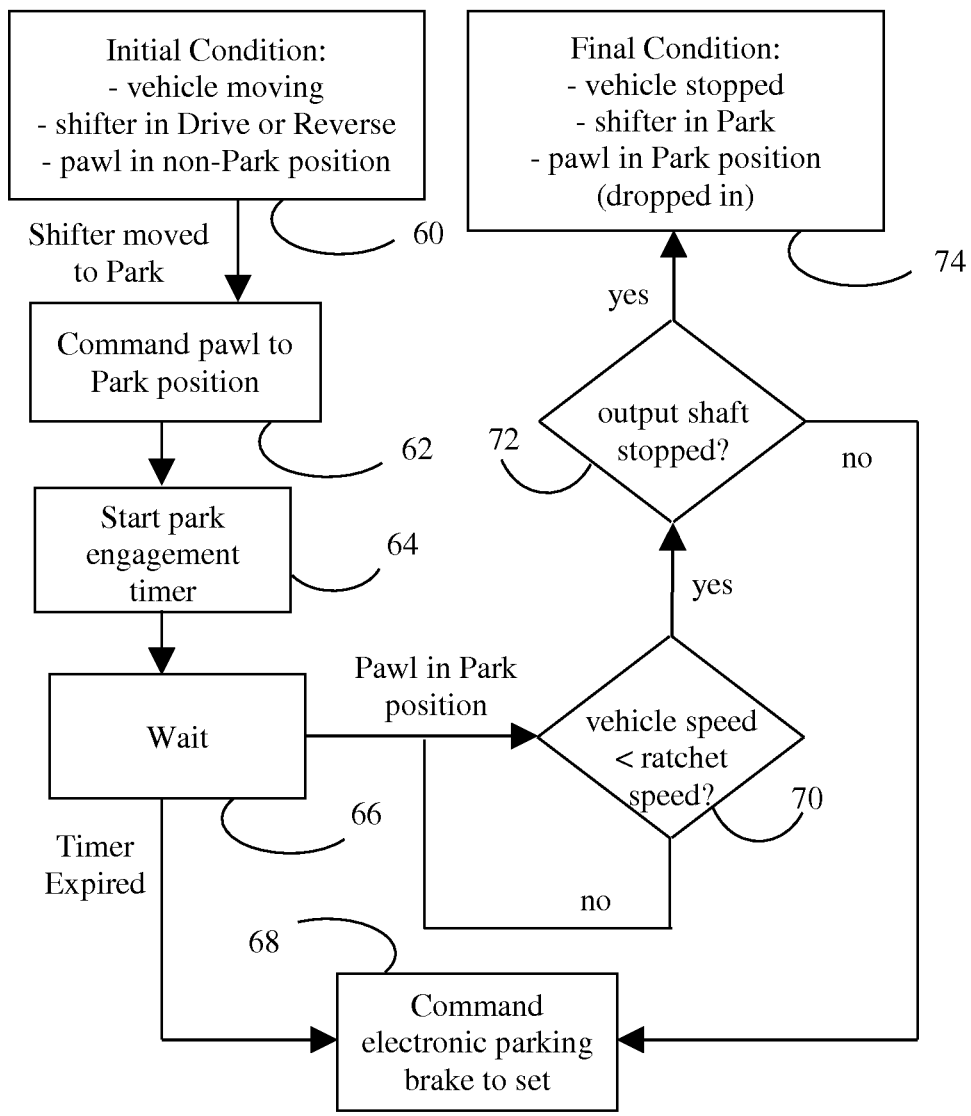
FIG. 2 is a flow chart for a method of engaging a shift-by-wire park mechanism while a vehicle is in motion.

FIG. 2 is a flow chart for the process used by controller 34 to respond to movement of shift lever 32 into Park while the vehicle is moving. In initial state 60, the vehicle is moving with the Shifter in Drive or Reverse. Parking pawl 38 is in the non-Park position. Control moves to 62 in response to a driver moving shifter 32 into the Park position. At 62, the controller commands the park pawl 38 into the Park position. Then, an engagement timer is started at 64 and the controller waits at 66 until either the timer expires or position sensor 40 indicates that pawl 38 has moved into the Park position. If the timer expired, the controller commands application of EPB 48 as a countermeasure to potential failure modes that may prevent pawl 38 from responding to commands in a timely manner. In the usual case of confirmation that pawl 38 has moved into the Park position before expiration of the timer, control moves to 70. If the vehicle is above the speed at which the parking mechanism is designed to ratchet, the controller waits at 70 until the speed decreases below the ratcheting speed. The controller may determine vehicle speed in any of a variety of ways, including a signal from an output shaft speed sensor or a signal from an anti-lock braking system. Once the vehicle speed is confirmed to be less than the ratcheting speed at 70, the controller checks at 72 to determine if the transmission output shaft stopped. If the output shaft has not stopped, then the controller commands application of EPB 48 as a countermeasure to potential failure modes that may prevent pawl 38 from engaging with parking gear 36. In the usual case, final state 74 is achieved in which the vehicle is stopped with pawl 38 engaged with park gear 36 to hold the vehicle stationary.

Figure 3:
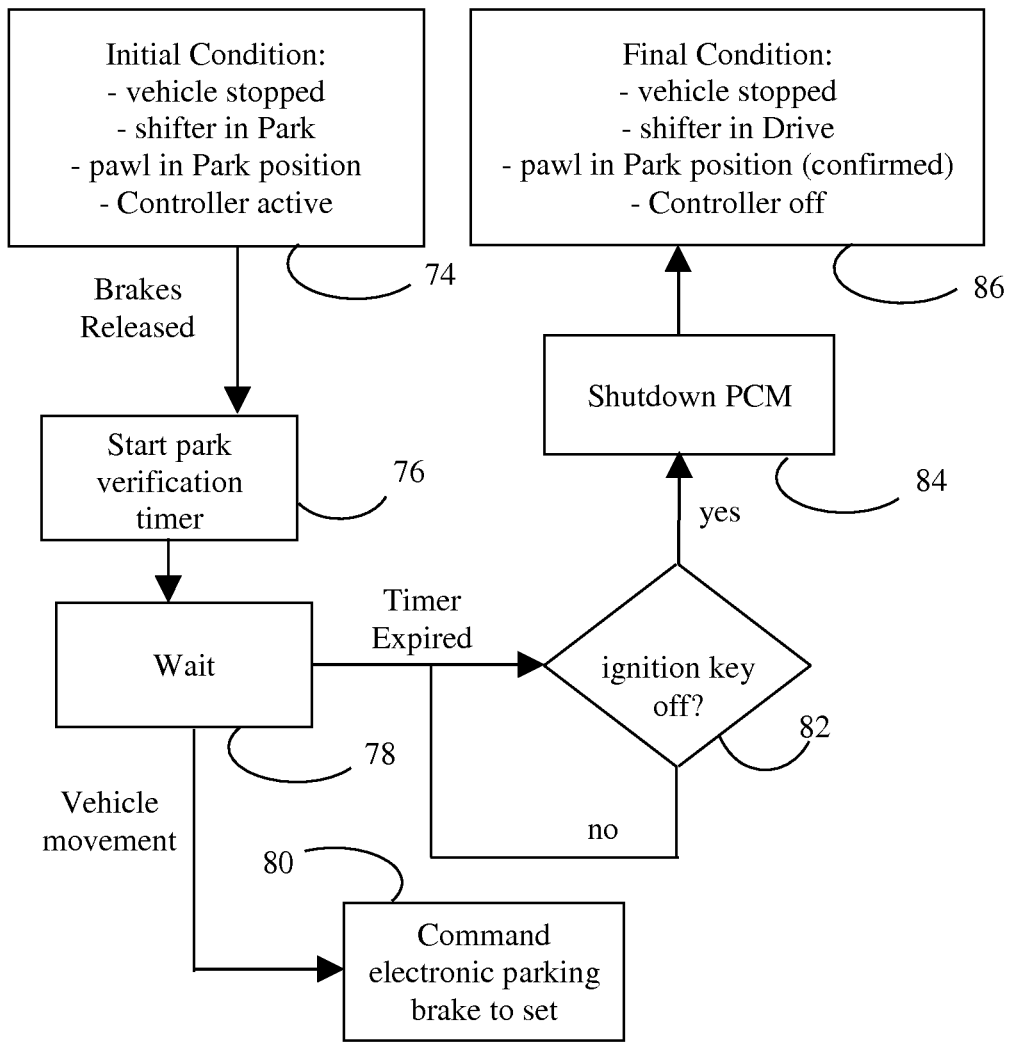
FIG. 3 is a flow chart for a method of verifying that the park mechanism is engaged before shutting down a controller including countermeasures for park mechanism failure.

FIG. 3 is a flow chart for the process used by controller 34 after the vehicle is stopped to ensure that the park mechanism is holding the vehicle stationary as opposed to only the braking system holding the vehicle stationary. The initial state 74 of this process is the final state of the process illustrated in FIG. 2. The vehicle is stopped with the Shifter in Park. Parking pawl 38 is in the Park position but controller 34 has not yet confirmed that the park pawl dropped in from the ratcheting mode to engage park gear 36. Controller 34 is still active at 74. Control moves to 76 in response to a driver releasing brake pedal 46. Then, park verification timer is started at 76 and the controller waits at 78 until either the timer expires or vehicle motion is detected. If vehicle motion is detected, the controller commands application of EPB 48 at 80 as a countermeasure to potential failure modes that may prevent pawl 38 from engaging with and remaining engaged with park gear 36. In the usual case, the timer expires and control moves to 78. If ignition key 50 is still on, the controller waits at 82 until the ignition key is turned off. Once the ignition key is off, the controller commands a shutdown at 84 and final state 86 is achieved.

Although Park is ordinarily engaged in response to driver movement of a shift lever as depicted in FIGS. 2 and 3, other events may trigger engagement of Park while the shift lever is not in the Park position. For example, the vehicle may include a sensor to detect the presence of a person in the driver's seat and automatically command Park if the driver's seat is unoccupied. As another example, the vehicle may automatically command Park if the driver's door is opened with the driver's seat belt not fastened.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a vehicle comprising:
   in response to a park triggering condition, electronically commanding engagement of a transmission park mechanism;
   in response to movement of the vehicle following the commanding and while the park triggering condition continues, automatically commanding engagement of an electronic park brake to restrain the vehicle; and
   following release of a brake pedal with the park triggering condition continuing, electronically monitoring changes in vehicle position for a predetermined period.

2. The method of claim 1 further comprising:
   delaying a shutdown of a controller following a key off event during the predetermined period such that the controller can monitor changes in vehicle position for the full predetermined period.

3. The method of claim 1 wherein the park triggering condition is driver selection of a PARK mode.

4. The method of claim 3 wherein the driver selects the PARK mode by moving a shift lever.

5. A method of operating a vehicle comprising:
   in response to driver selection of a PARK mode while the vehicle is in motion, electronically commanding engagement of a transmission park mechanism; and
   after commanding engagement of the transmission park mechanism, waiting until a vehicle speed is between zero and a ratchet threshold value for a predetermined amount of time and then commanding engagement of an electronic park brake to restrain the vehicle.

6. A vehicle comprising:
   a transmission including a park mechanism configured to secure the vehicle against movement in response to a Park command;
   an electronic parking brake configured to selectively hold the vehicle against movement with the transmission park mechanism disengaged; and
   a controller programmed to respond to vehicle movement after a release of a brake pedal while the transmission park mechanism is commanded to Park by applying the electronic parking brake to secure the vehicle.

7. The vehicle of claim 6 wherein the controller is further programmed to:
   monitor changes in vehicle position for a predetermined period following the release of the brake pedal; and
   delaying a controller shutdown following a key off event during the predetermined period such that the controller can monitor changes in vehicle position for the full predetermined period.

8. The vehicle of claim 6 wherein the park mechanism is commanded to Park by driver movement of a shift lever.

9. A controller comprising:
   communications channels configured to receive a signal indicating vehicle movement and a signal indicating a brake pedal position and to send a signal commanding engagement of an electronic parking brake; and
   control logic configured to monitor vehicle movement for a predetermined period following release of a brake pedal with a parking pawl commanded to be in a park position and to respond to movement of the vehicle while the parking pawl is commanded to be in the park position by commanding engagement of the electronic park brake to restrain the vehicle.

10. The controller of claim 9 wherein the communications channels are further configured to send a signal controlling a parking pawl position and to receive a signal indicating the parking pawl position.

11. The controller of claim 9 wherein:
   the communications channels are further configured to receive a signal indicating a key position; and
   the control logic is further configured to delay a controller shutdown following a key off event during the predetermined period such that the controller can monitor changes in vehicle position for the full predetermined period.

* * * * *